(12) United States Patent
Kuo et al.

(10) Patent No.: US 7,861,091 B2
(45) Date of Patent: Dec. 28, 2010

(54) SMART CARD ENABLED SECURE COMPUTING ENVIRONMENT SYSTEM

(75) Inventors: Chih Jen Kuo, Milpitas, CA (US); Miao Li, San Jose, CA (US); Wei Luo, San Jose, CA (US)

(73) Assignee: O2Micro International Limited, Grand Cayman (KY)

( * ) Notice: Subject to any disclaimer, the term of this patent is extended or adjusted under 35 U.S.C. 154(b) by 1329 days.

(21) Appl. No.: 10/273,960

(22) Filed: Oct. 18, 2002

(65) Prior Publication Data

US 2003/0088780 A1  May 8, 2003

Related U.S. Application Data

(63) Continuation-in-part of application No. 09/796,847, filed on Feb. 28, 2001, now Pat. No. 7,376,711.

(60) Provisional application No. 60/346,824, filed on Oct. 18, 2001.

(51) Int. Cl.
  *G06F 21/00* (2006.01)
(52) U.S. Cl. ............... 713/185; 713/182; 726/9; 726/20
(58) Field of Classification Search ......... 713/182–186, 713/1; 726/2, 9, 16, 20, 27–29; 705/65, 705/66, 41–44; 709/225, 229, 219, 217; 455/410, 411; 235/375–382; 711/115
See application file for complete search history.

(56) References Cited

U.S. PATENT DOCUMENTS 4,800,590 A  1/1989  Vaughan .................. 380/25

(Continued)

FOREIGN PATENT DOCUMENTS

GB  2324395 A  10/1998

(Continued)

OTHER PUBLICATIONS

Office Action from Taiwan for foreign patent application No. 91124119 dated May 15, 2006 (4 pgs).

(Continued)

*Primary Examiner*—Nirav Patel

(57) ABSTRACT

A smart card enabled secure computing environment system locks the host computer system from user access and waits for a smart card to be inserted into an attached or co-resident smart card reader. When a smart card is inserted into the smart card reader, the invention asks the user to enter his smart card password which is compared to the password on the smart card. If the two passwords match, the invention looks up the user's username in an access file of valid users and finds its associated access times and/or cumulative time limits in the access file. if the current time is within any of the valid access times and the user's cumulative usage time is within the specified cumulative time limit, then access is granted and the system is unlocked. The invention periodically checks the current time while the user is using the computer. If a blocked time period is entered or a cumulative time limit is exceeded, the user is logged off the machine and the computer is locked from user access. If at any time the user's smart card is removed from the smart card reader the invention will shut down all of the user's programs and lock the system.

22 Claims, 16 Drawing Sheets

U.S. PATENT DOCUMENTS

| | | | |
|---|---|---|---|
| 4,885,778 A * | 12/1989 | Weiss | 713/184 |
| 5,146,499 A | 9/1992 | Geffrotin | |
| 5,721,781 A * | 2/1998 | Deo et al. | 380/25 |
| 5,836,010 A * | 11/1998 | Kim | 726/20 |
| 5,857,024 A * | 1/1999 | Nishino et al. | 713/172 |
| 5,944,794 A | 8/1999 | Okamoto et al. | |
| 5,983,273 A | 11/1999 | White et al. | |
| 5,995,965 A | 11/1999 | Experton | |
| 6,038,551 A | 3/2000 | Barlow et al. | |
| 6,044,382 A | 3/2000 | Martino | |
| 6,055,512 A | 4/2000 | Dean et al. | |
| 6,141,752 A | 10/2000 | Dancs et al. | |
| 6,161,176 A | 12/2000 | Hunter et al. | |
| 6,170,064 B1 * | 1/2001 | Lee | 713/502 |
| 6,182,212 B1 | 1/2001 | Atkins et al. | |
| 6,199,114 B1 * | 3/2001 | White et al. | 709/229 |
| 6,260,111 B1 * | 7/2001 | Craig et al. | 711/115 |
| 6,353,448 B1 | 3/2002 | Scarborough et al. | |
| 6,370,629 B1 * | 4/2002 | Hastings et al. | 711/163 |
| 6,370,646 B1 | 4/2002 | Goodman et al. | |
| 6,374,356 B1 * | 4/2002 | Daigneault et al. | 726/20 |
| 6,400,823 B1 | 6/2002 | Angelo | 380/25 |
| 6,438,550 B1 | 8/2002 | Doyle et al. | |
| 6,446,138 B1 | 9/2002 | Criscolo et al. | 710/1 |
| 6,490,601 B1 | 12/2002 | Markus et al. | |
| 6,539,479 B1 | 3/2003 | Wu | |
| 6,581,162 B1 | 6/2003 | Angelo et al. | |
| 6,611,914 B1 * | 8/2003 | Lee et al. | 726/9 |
| 6,618,810 B1 * | 9/2003 | Dirie | 726/27 |
| 6,678,824 B1 * | 1/2004 | Cannon et al. | 726/22 |
| 6,711,687 B1 * | 3/2004 | Sekiguchi | 726/23 |
| 6,738,901 B1 | 5/2004 | Boyles et al. | |
| 6,751,671 B1 | 6/2004 | Urien | |
| 6,810,479 B1 * | 10/2004 | Barlow et al. | 713/185 |
| 6,944,650 B1 | 9/2005 | Urien | |
| 7,047,558 B1 | 5/2006 | Mariana | |
| 7,111,321 B1 * | 9/2006 | Watts et al. | 726/2 |
| 7,117,369 B1 * | 10/2006 | Burns et al. | 713/182 |
| 7,181,626 B1 * | 2/2007 | Rasmussen | 713/185 |
| 7,461,249 B1 * | 12/2008 | Pearson et al. | 713/156 |
| 2002/0004783 A1 | 1/2002 | Paltenghe et al. | |
| 2002/0010679 A1 | 1/2002 | Felsher | 705/51 |
| 2002/0029254 A1 | 3/2002 | Davis et al. | |
| 2002/0103884 A1 | 8/2002 | Duursma et al. | 709/219 |
| 2002/0174235 A1 * | 11/2002 | Likourezos | 709/228 |
| 2003/0001016 A1 | 1/2003 | Fraier et al. | |
| 2003/0196085 A1 | 10/2003 | Lampson et al. | |
| 2004/0230536 A1 | 11/2004 | Fung et al. | |

FOREIGN PATENT DOCUMENTS

| | | |
|---|---|---|
| WO | WO 97/29416 | 8/1997 |
| WO | WO 98/26344 A2 | 6/1998 |
| WO | WO 00/46966 | 8/2000 |

OTHER PUBLICATIONS

Current claims in Taiwan patent application No. 911241190 (9 pgs), May 2006.

European Patent Office, "Communication pursuant to Article 96(2) EPC," App. No. 01913245.5, dated Jan. 18, 2006, 5 pages.

Current Claims, EP App. No. 01913245.5, 4 pages, Jan. 2006.

International Searching Authority, "Notification of Transmittal of the International Search Report and the Written Opinion of the International Searching Authority, or the Declaration," dated Jan. 28, 2005, 9 pages.

Current claims of patent application No. PCT/US04/13663, 3 pages, Apr. 2004.

PCT International Preliminary Report, International Application No. PCT/US2004/013663 dated Nov. 4, 2005 containing PCT Written Opinion of ISA (4 pgs).

Office Action from China for foreign patent application No. 01808581.4 dated Dec. 3, 2004.

Current claims in China patent application No. 018085814, Dec. 2004.

Office Action from EPO for foreign patent application No. 01 913 245.5-2201 dated Sep. 27, 2007 (4 pgs).

Current Claims in EPO OA patent application No. 01 913 245.5-2201, Sep. 2007.

* cited by examiner

SMART CARD ENABLED SECURE COMPUTING ENVIRONMENT SYSTEM

CROSS-REFERENCE TO RELATED APPLICATIONS

This application is a Continuation-in-part of U.S. Ser. No. 09/796,847 filed Feb. 28, 2001 now U.S. Pat. No. 7,376,711 and claims priority to U.S. Provisional Patent Application No. 60/346,824 Oct. 18, 2001.

BACKGROUND OF THE INVENTION

1. Technical Field

The invention relates to personal computer security. More particularly, the invention relates to regulating user access control to computing environments using personalized smart cards.

2. Description of the Prior Art

The current computing environment requires users, in general, to physically carry either a laptop or a notebook portable computer in order to maintain a fully functional, truly personalized, computing environment when moving from place to place. Because laptop and notebook computers, though physically small, are comparatively bulky and heavy, mobile computer users continuously seek ever smaller and lighter devices that will provide and maintain their personalized computing-environment.

An example of such a smaller and lighter device that has recently enjoyed significant commercial popularity is the personal digital assistant ("PDA"). However, even though PDAs are smaller and lighter than laptop or notebook computers and provide a personalized computing environment, they do not presently offer the full functionality of desktop, laptop or notebook portable computers.

For example, when a PDA is removed from an environment in which a computer user has a fully functional computing environment, the PDA must first be loaded with an up-to-date image of data for pertinent portions of that environment, e.g., an address book, calendar, email, etc. Similarly, when a PDA returns to the fully functional computing environment, data in the PDA that has changed since leaving the fully functional computing environment must be transferred and/or synchronized from the PDA back into the user's regular computer and vice versa.

Desktop computers capable of accessing the Internet are ubiquitous in industrialized countries worldwide. A computer user, while traveling, can usually obtain access to such a computer and use that computer's Internet access to communicate worldwide. With sufficient data and appropriately configured, such computers could, in principle, provide mobile computer users with a fully functional personal computing environment. However, establishing a mobile computer user's fully functional computing environment at a remote or transitory location, e.g., in an airport kiosk or overnight lodging, requires error-free entry of a prodigious amount of highly detailed information to configure the local computer.

The amount of information required to configure a local computer so it provides the mobile computer user's fully functional, personal computing environment is disproportionately large in comparison with the benefit obtained. Consequently, there presently does not exist any convenient hardware and software that permits mobile computer users to move from computer to computer anywhere in the world, carrying with them their personalized, fully functional computing environment.

Further, with users migrating from desktop computer to desktop computer or using a portable laptop computers, corporate IT groups (as well as individual computer owners) need to regulate the usage of company (and personal) computers. Access to these computers are presently limited to username and password entry. Upon the correct entry of a username and password, a user is allowed access to a "secure" computer. However, usernames and passwords are easily obtained.

Presently, smart cards are used primarily for facilitating financial transactions. However, because smart cards include at least a limited amount of non-volatile readable and writeable memory and may also include a programmable processor, they inherently possess a capability for use in applications other than financial transactions. Storing data into a smart card, accessing that data, and activating a smart card's processor to execute a computer program all require that the smart card be interconnected with some type of reader/terminal. This characteristic of smart cards limits the potential for broadening their use for mobile computing applications because, in general, there does not presently exist an infrastructure that supports the use of smart cards for applications other than financial transactions.

It would be advantageous to provide a smart card enabled secure computing environment system that allows a user or system administrator to configure a computer to regulate usage and access to the computer based on information contained in a user's smart card. It would further be advantageous to provide a smart card enabled secure computing environment system that gives the user or system administrator the flexibility of regulating usage of a computer based on time or duration of use on a per smart card basis.

SUMMARY OF THE INVENTION

The invention provides a smart card enabled secure computing environment system. The system allows a user or system administrator to configure a computer to regulate usage and access to the computer based on information contained in a user's smart card. In addition, the invention provides the user or system administrator the flexibility of regulating usage of a computer based on time or duration of use on a per smart card basis.

A preferred embodiment of the invention locks the host computer system from user access and waits for a smart card to be inserted into an attached or co-resident smart card reader/terminal. When a smart card is inserted into the smart card reader, the invention asks the user to enter his smart card password which is compared to the password on the smart card.

If the two passwords match, the invention then looks up the user's username in an access file of valid users, if it is not found, then access is denied. Otherwise, the invention finds the user's username and its associated access times and/or cumulative time limits in the access file. If the current time falls outside of any of the valid access times, then access is denied. If an optional cumulative time limit is set and the user's cumulative usage time exceeds the specified cumulative time limit, then access is denied.

If the current time is within any of the valid access times and (optionally) the user's cumulative usage time is within the specified cumulative time limit, then access is granted and the system is unlocked.

The invention periodically checks the current time while the user is using the computer. The user is warned at preset intervals if a blocked access time is approaching. When the blocked time period is entered, the user is logged off the machine and the computer is locked from user access.

If a cumulative time limit was specified, when the periodic check of the current time is performed, the invention will add the time since the last check to the user's cumulative usage time and store the new cumulative time in the access list. If the user's cumulative usage time is about to exceed any of the specified cumulative time limits, then the user is warned. Once the blocked time period is entered, the user is logged off the machine and the computer is locked from user access.

If at any time the user's smart card is removed from the smart card reader/terminal the invention will shut down all of the user's programs and lock the system.

The invention allows a user to automatically logon to a Windows XP host computer by simply inserting his smart card into the smart card reader/terminal. The invention requires a user to validate his smart card password once and remembers that user has validated his smart card password. The user can then remove his smart card from the reader and the invention will lock the system. If the user comes back to the computer and re-inserts his smart card into the reader, the invention will unlock the computer and the user will continue from where he left off. However, if another user inserts his smart card into the reader, the invention will log the previous user off Windows XP and the user's processes are terminated.

Other aspects and advantages of the invention will become apparent from the following detailed description in combination with the accompanying drawings, illustrating, by way of example, the principles of the invention.

DETAILED DESCRIPTION OF THE INVENTION

The invention is embodied in a smart card enabled secure computing environment system. A system according to the invention allows a user or system administrator to configure a computer to regulate usage and access to the computer based on information contained in a user's smart card. In addition, the invention provides the user or system administrator the flexibility of regulating usage of a computer based on time or duration of use on a per smart card basis.

The invention provides a user or system administrator with the ability to restrict user access time or usage duration to a computer based on information contained in a user's smart card. The invention also provides a system that allows automatic Microsoft Windows XP user based on information contained in a user's low cost memory card.

A preferred embodiment of the invention stores, in a smart card, sufficient information to permit characterizing a mobile computer user's personalized, fully functional computing environment. The information that the mobile personal computing environment supplies may differ from system to system. However, the amount of information stored in the smart card is sufficient to create a consistent computing environment for the user. Information such as operating system preferences, favorite Web sites, email addresses, credit card information, ISP information, program preferences, program environments, etc. are stored in the smart card.

Figure 1:
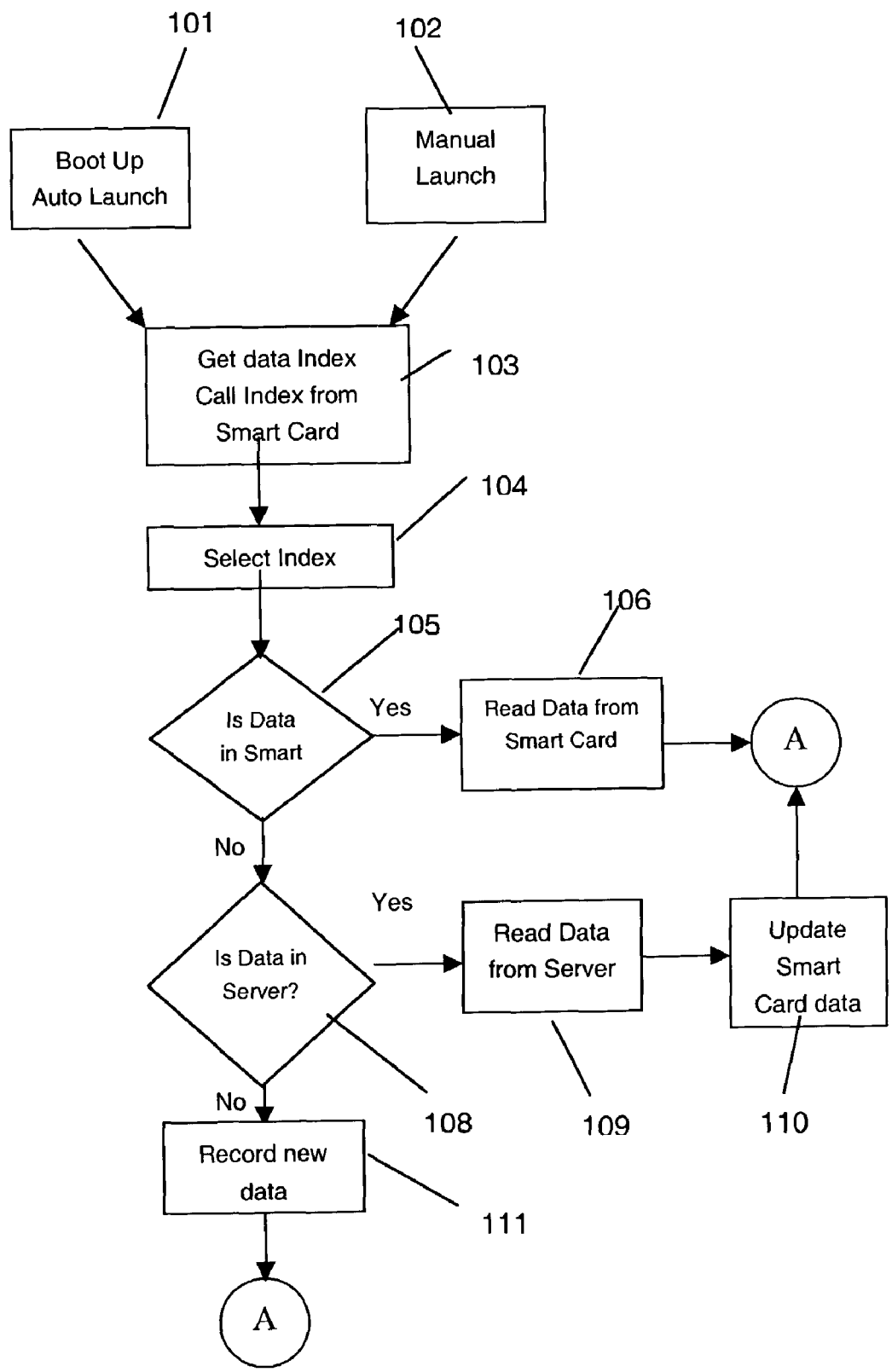
FIG. 1 is a flowchart showing the execution flow of the client to server exchange when the user specifies the indices required for his personal computing environment according to the invention.

Referring to FIG. 1, the user activates the invention's client computer program through an auto launch at boot-up 101 or through a manual launch 102 when he begins to use a client computer. A smart card reader/terminal is connected to, or resident in, the user's computer, reading the user's smart card. The client computer program retrieves indices from the smart card 103. The user specifies to the invention the data needed to establish at least a portion of his mobile personal environment through the invention's user interface 104.

The invention checks the smart card to determine if the specified data is present in the smart card's local memory 105. If the specified data is in the smart card's memory, then the invention retrieves the data from the smart card for subsequent use by the invention 106. If the specified data is not in the smart card's memory, then the invention accesses, via the Internet or other method, a secure server that stores additional data which more fully characterizes the mobile computer user's personalized, fully functional computing environment 108. The invention then retrieves the specified data from the server for subsequent use by the invention 109 and updates the smart card data 110. If the data is not on the server 108, then it is new data from the user which must be recorded and used to access the Internet 111.

Figure 2:
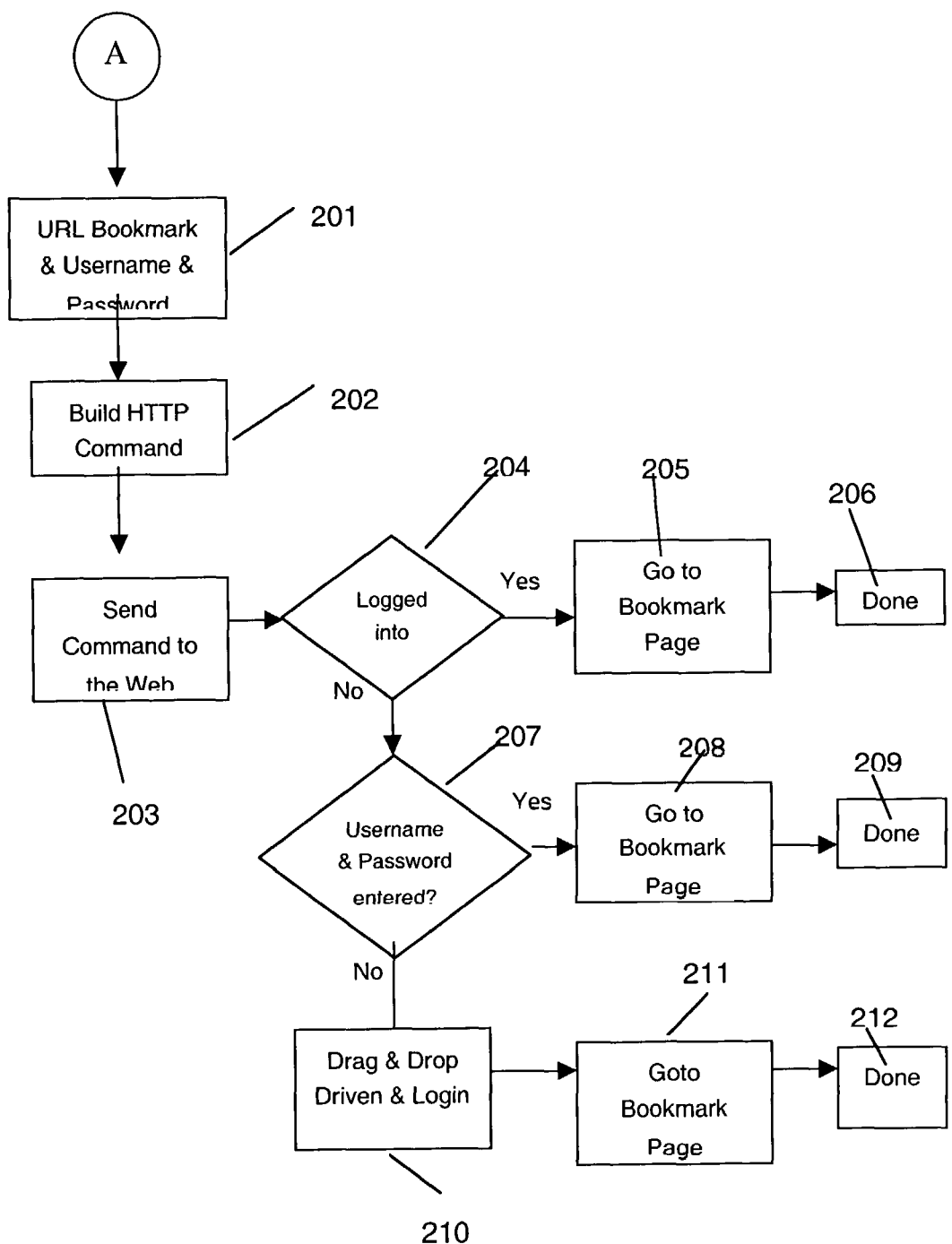
FIG. 2 is a flowchart showing the execution flow of the client to server exchange when the user specifies the indices required for his personal computing environment according to the invention.

With respect to FIG. 2, having retrieved the required data either from the smart card, the server, or directly from the user, the client computer program uses the data to construct a Uniform Resource Locator (URL) 201 and, if possible, gather the username, password, and Internet site bookmark data needed to immediately and directly access an Internet site that constitutes at least some part of the mobile computer user's mobile personal environment 202.

Using the data constructed in this way, the invention then builds a URL command and sends it to the Internet 203. The URL, username, password and Internet site bookmark data, if complete, permit the mobile computer user to log onto the specified Internet site 204 and proceed immediately to a specified page at that Internet site 205. If some information is incorrect or incomplete, interacting with the Internet site accessed by the URL, the mobile computer user can either enter, as required, the username, password, and Internet page data to access a desired Internet page 207, 208, or may supply that information through a graphical user interface (GUI) that provides a drag and drop capability 210, 211.

Figure 3:
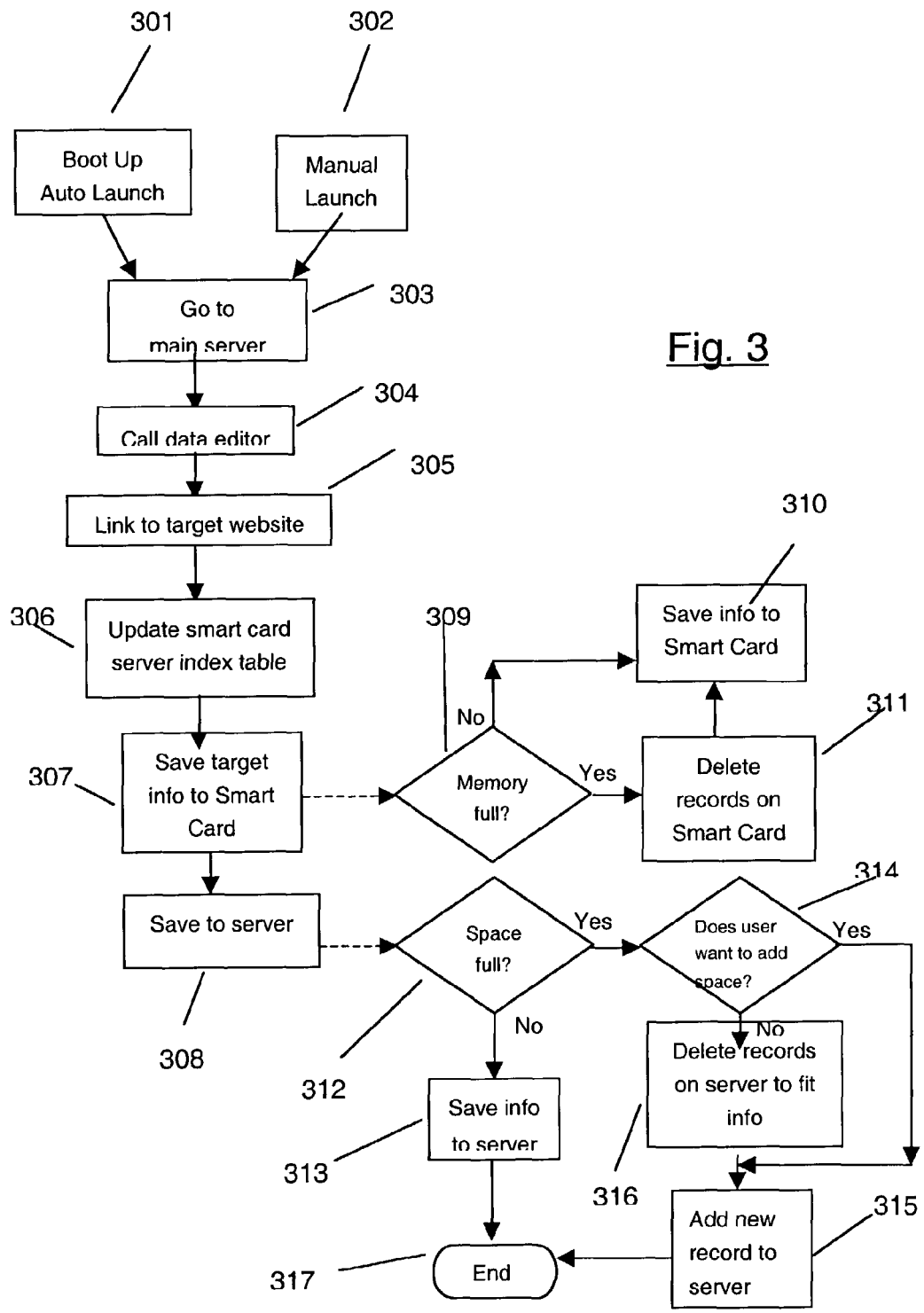
FIG. 3 is a flowchart showing the schema for managing a user's personal computing environment data between a server database and a smart card according to the invention.

Referring to FIG. 3, to initialize or update indices stored on the smart card, the user activates the invention's client computer program 301, 302, instructing the program to access, via the Internet or other method, the server that stores additional information which characterizes a mobile computer user's personalized, fully functional computing environment 303. The server permits the user to change data characterizing his personalized mobile personal environment 304, for example, adding a new Internet site to his environment. After the user specifies changes to be made in his mobile personal environment, the server links to the specified Internet site and determines updated indices for storage on the smart card 305.

After linking to the specified Internet site and updating the computing environment information stored at the server 306, the invention attempts to update the indices stored on the user's smart card connected to his computer 307. If the smart card memory is full 309, then one record is deleted from those stored in the smart card until the smart card has sufficient free memory to store the updated indices 311, the updated index is then written into the smart card's memory 310. Otherwise, if the smart card memory is not full 309, then the updated indices are immediately stored on the smart card 310. In addition to saving the updated indices on the smart card, the server also saves the updated index in its database which characterizes this mobile computer user's mobile personal environment 308.

If the amount of unused storage in the server's database is sufficient to store the updated indices 312, then the information is stored in the database 313. Otherwise, the server first offers the user an opportunity to allocate more server storage for his indices 314. If the user declines the offer of additional storage, then the server deletes one record from the database until the server has sufficient free memory to store the updated indices 316. The server then adds the updated index to the indices stored in the database 315. If the user accepts the offer of additional storage 314, then the new index is added to the server's database 315. The mobile computer user is able to initially specify and, as required, update data that characterizes his mobile personal environment.

The user is allowed to create sets of indices when storing a larger amount of information on the server than is available on the user's smart card. The user can then choose between different sets of information to be downloaded to his smart card. For example, the user can set his smart card to his personalized mobile computer environment for his U.S. office, foreign office, or even his home. This allows the user to characterize each separate and distinct computer system that he uses.

One skilled in the art will readily appreciate that although the mobile computer user's personalized computer environment is specifically mentioned above, any other type of information, such as personal data, financial data, operating system, computer personality, video and/or audio data, etc., are easily substituted in its place.

Figure 4:
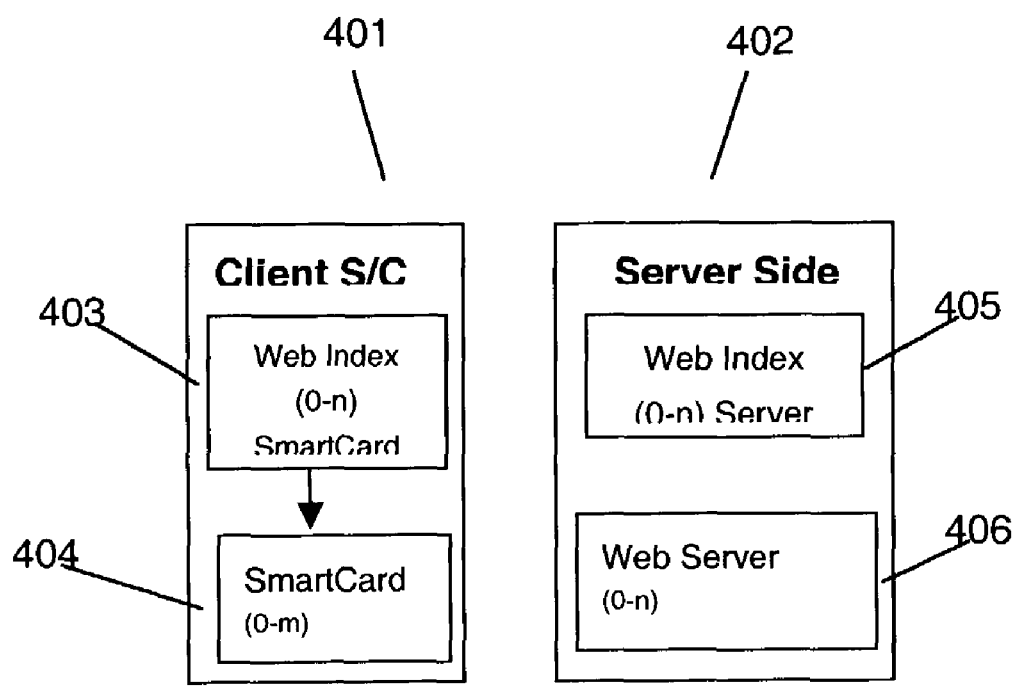
FIG. 4 is a block schematic diagram showing the user's indices accessible on a client and a server according to the invention.

With respect to FIG. 4, the invention provides an infrastructure that permits using smart cards for applications other than financial transactions. The smart card 404 is interconnected with a smart card reader/terminal that can communicate via the Internet, extranet, or intranet 402. Using this device 401, a computer user specifies characteristics for some computing function. Presuming that the reader/terminal is connected to the user's personal computer, an index for the specified computing function is stored into that computer's memory 403. Also, the index is stored both into the smart card 404 and into a server accessible via the Internet, extranet, or intranet 402, 405, 406.

Figure 5:
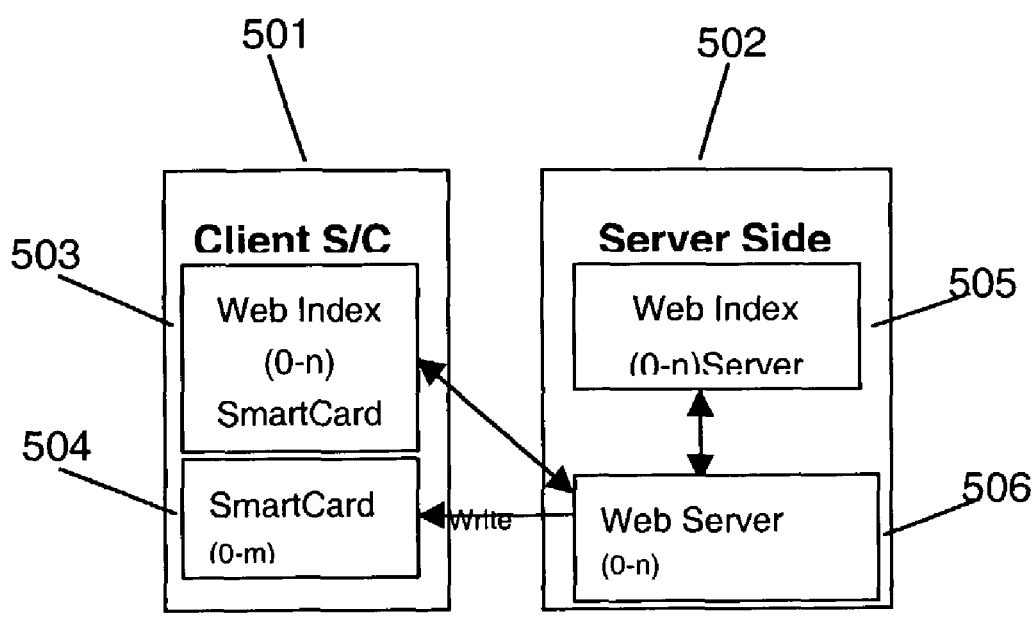
FIG. 5 is a block schematic diagram showing the exchange of the user's indices between a client and a server according to the invention.

Referring to FIG. 5, in general, the smart card stores only a fraction of a computer user's total indices since smart cards possess only a limited amount of memory. When those indices completely fill the available smart card memory 504, addition of another index causes the least recently used index to be deleted from the smart card's memory 504. However, because the server may, in principle, store more indices 505 than the smart card 504, the index discarded from the smart card 504 can remain stored and accessible at the server 502, 506. In this way, the smart card 504 carries indices that characterize at least some fraction of computing functions specified by individual computer users 503, 505, thereby making those functions accessible to the computer user worldwide 506 at any suitably programmed smart card reader/terminal.

Figure 6:
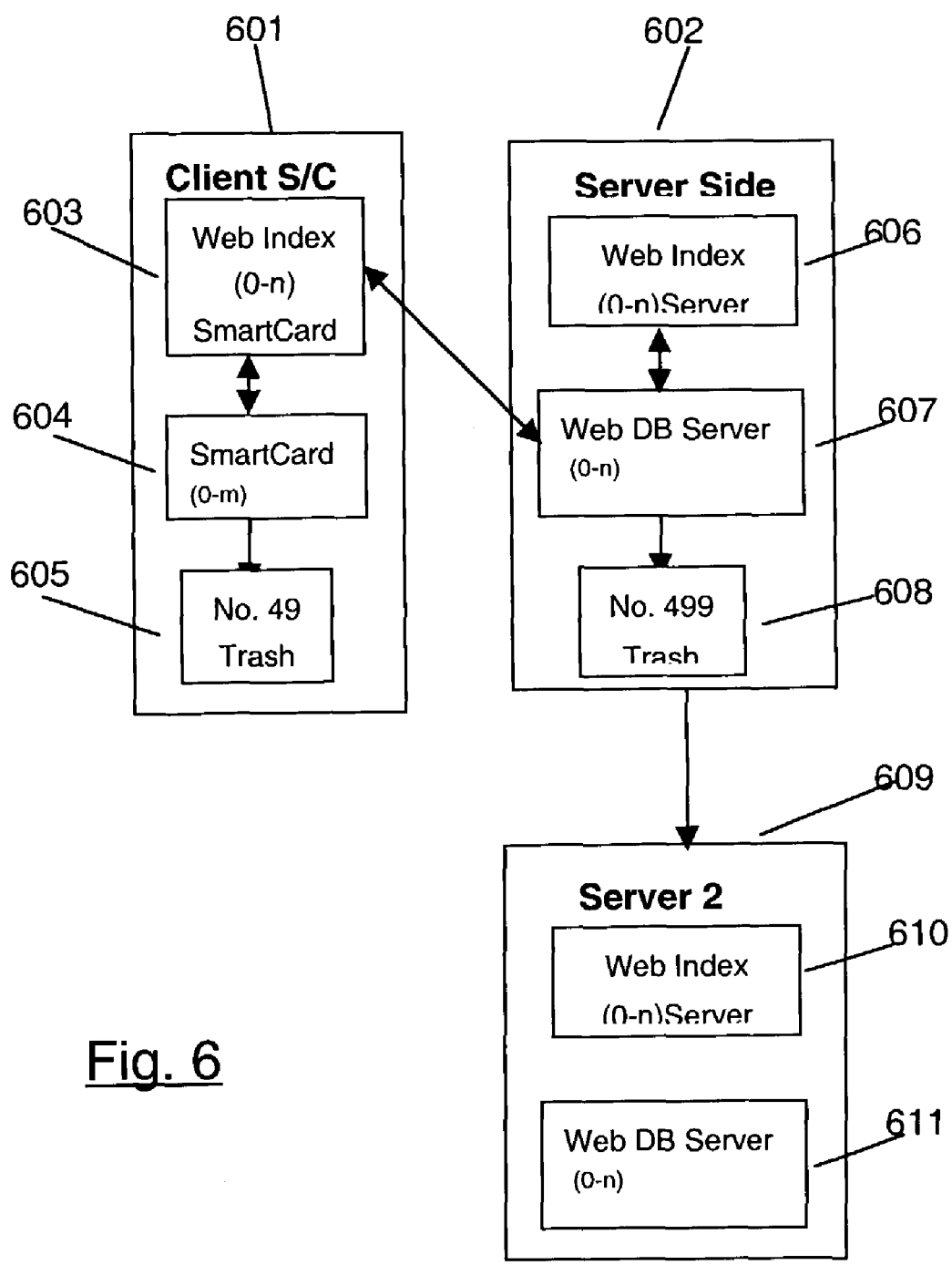
FIG. 6 is a block schematic diagram showing the exchange of data between the user's smart card, a client, a server, and a redundant server when a user index is deleted according to the invention.

With respect to FIG. 6, in accessing a pre-specified computer function, the smart card 604 is placed in a suitably programmed reader/terminal 601 from which the index stored in the smart card 604 is transferred to that reader/terminal or host computer device's memory 603. If the requested index is not present in the smart card's memory 604, the device 601 then accesses the server 602 via the Internet, extranet, or intranet 607 to retrieve the index that is stored there 606. Because retrieving a particular index from the server 602 makes it the most recently used index, the device 601 transfers the index both to the device's memory 603 and replaces the least recently used index 605 in the smart card's memory 604 with the most recently used index. If a new index is added to the server database 606 when the database 606 is full, the system either discards the least recently used index 608 or, if possible, gives the user the option to allocate more server storage for his records, as described above.

Another preferred embodiment of the invention adds a backup server 609 that contains a consistent copy of the entire user database 606 served by the main server 602. If the main server 602 fails, the backup server 609 takes over. The backup server's database 610 and external interface 611 are identical to the main server's 602 components.

Additionally, a plurality of servers can be used along with load balancing, to handle large amounts of client requests. The client can perform its own load balancing among the servers by using, for example, the response time (RTT) from each server to determine the best choice. If the main server serving the user fails or is otherwise inaccessible, then the client will automatically switch to another server.

Figure 7:
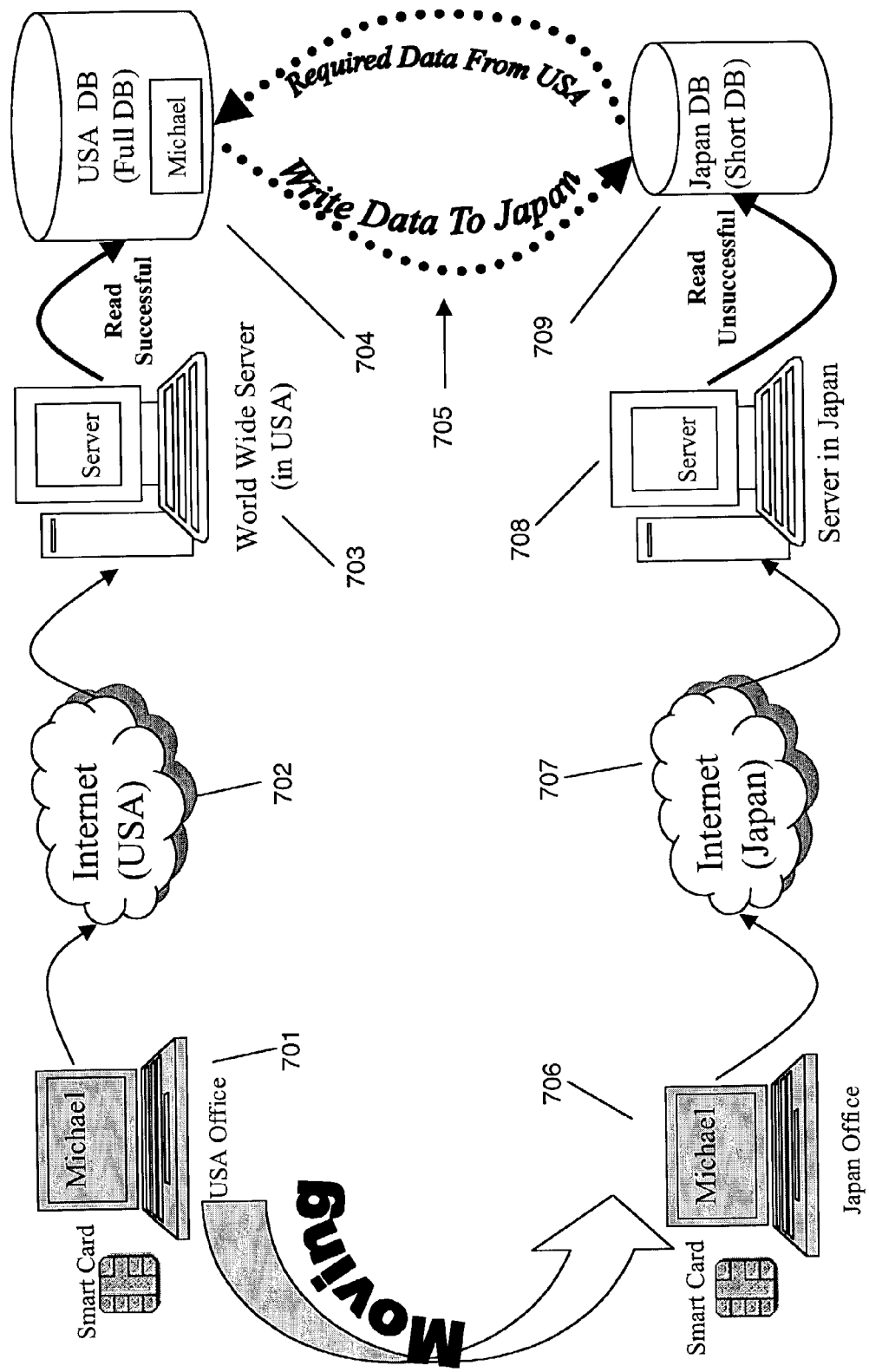
FIG. 7 is a block schematic diagram depicting a scenario when the server responsible for a particular user is switched when the user relocates according to the invention.

Referring to FIG. 7, to efficiently utilize server resources distributed at various locations throughout the world, the invention records places in the world from which a user accesses his mobile personal environment. Recording such data permits the server to reasonably determine that a user has moved from one place to another, e.g., from the United States to Japan. For example, if a user who had previously accessed his mobile personal environment 704 mostly from the United States 701, 702, 703 suddenly began accessing that environment 704, 709 entirely from Japan 706, 707, 708 for an extended interval of time, e.g., one or two months, then the server 704 can reasonably determine that the user has moved from the United States to Japan. If the server 704 determines that the user has relocated his residence and if there exists another server 709 that is located physically closer to the user's new residence, then the systems operating on both servers 704, 709 effect a transfer of the user's mobile personal environment indices 705 from the more remote server 704 to the nearer server 709.

The invention allows mobile computer users to carry, on a single smart card, all the information required to characterize their mobile personal environment and to quickly establish their mobile personal environment anywhere in the world.

Figure 8:
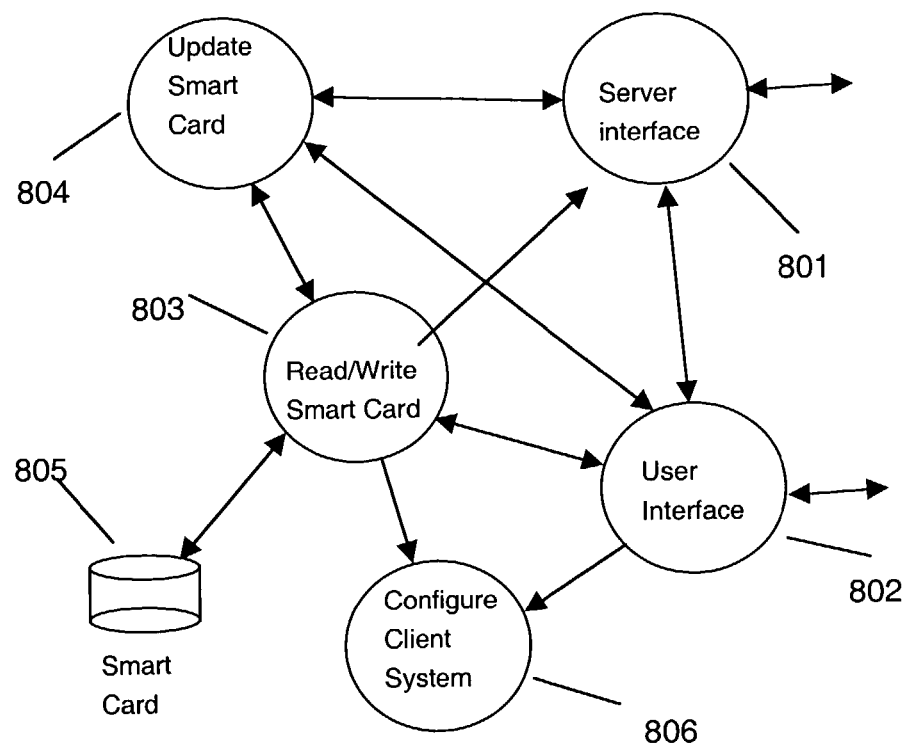
FIG. 8 is a block schematic diagram of a task-oriented viewpoint of a preferred embodiment of the invention illustrating the client and server tasks for a server-based data management system according to the invention.
Figure 8:
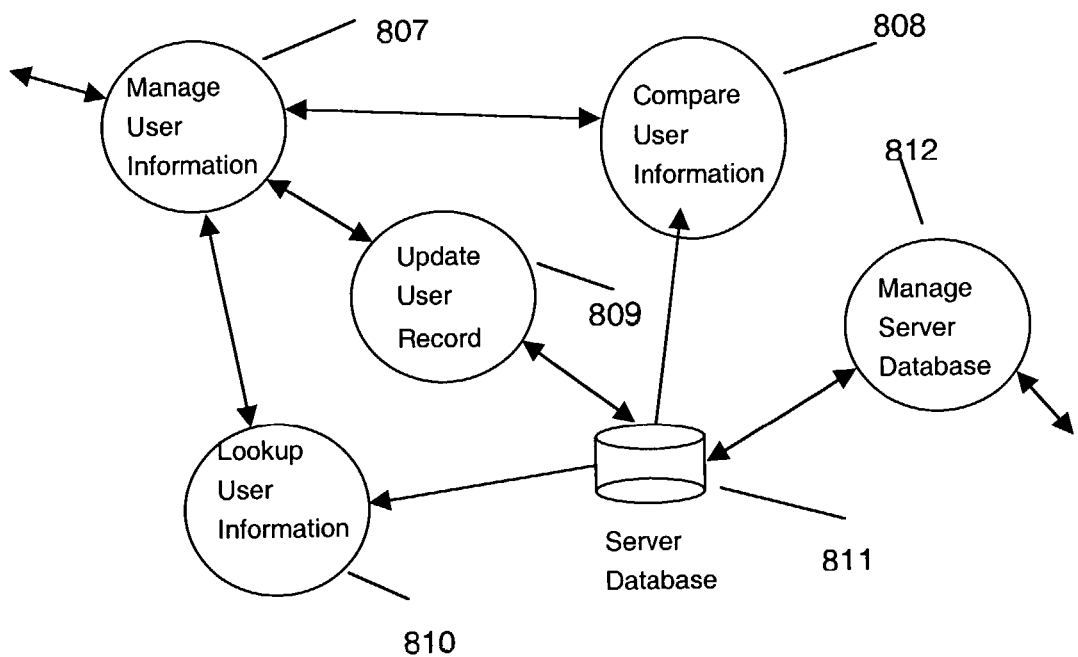

With respect to FIG. 8, a high-level task viewpoint of a preferred embodiment of the invention is shown. The user plugs his Smart Card 805 into the smart card reader that is connected to, or resident in, the client computer. The Configure Client System module 806 reads the Smart Card 805 through the Read/Write Smart Card module 803. The Configure Client System module 806 either automatically configures the client computer to the user's personal computing environment or queries the user through the User Interface 802 for the information needed from the Smart Card 805 to configure the user's personal computing environment (as described above), depending on the user's preference settings.

The user can also manage the indices stored on his Smart Card 805 and the Server Database 811. The Server Interface module 801 communicates with the secure server containing the user's information. The communication is through the secure Web site provided by the Manage User Information module 807 on the server. The Manage User Information module 807 displays the user's indices stored on the Server Database 811. The user requests his indices through the secure Web site. His indices are retrieved from the Server Database 811 by the Lookup User Information module 810. The Lookup User Information module 810 relays the index information to the Manage User Information module 807. The indices resident on the user's Smart Card 805 are sent to the Manage User Information module 807 through the Server Interface 801. The smart card indices are compared with the user's indices from the Server Database 811 by the Compare User Information module 808, which correlates and compares any differences between the two sources. The Manage User Information module 807 displays the information to the user through a secure Web page.

The user can create (for new users), add, delete, and update his indices through the User Interface module 802 connection to the secure Web page. The Server Database 811 indices are updated through the Update User Record module 809. Smart Card indices are updated by the Manage User Information module 807 through the Server Interface 801. The Server Interface 801 sends the update information to the Update Smart Card module 804. The Update Smart Card module 804 writes the information to the Smart Card 805 through the Read/Write Smart Card Module 803.

In the case of multiple servers, the Server Database 811 is redundantly stored among other servers. The Server Database 811 is updated with information from other servers by the Manage Server Database module 812. Any new updates to the Server Database 811 that are initiated locally are sent out to other servers by the Manage Server Database module 812.

Additionally, any transfers of user index records from one server to a more local server (in case of the user relocating to another location) is performed by the Manage Server Database module 812.

Figure 9:
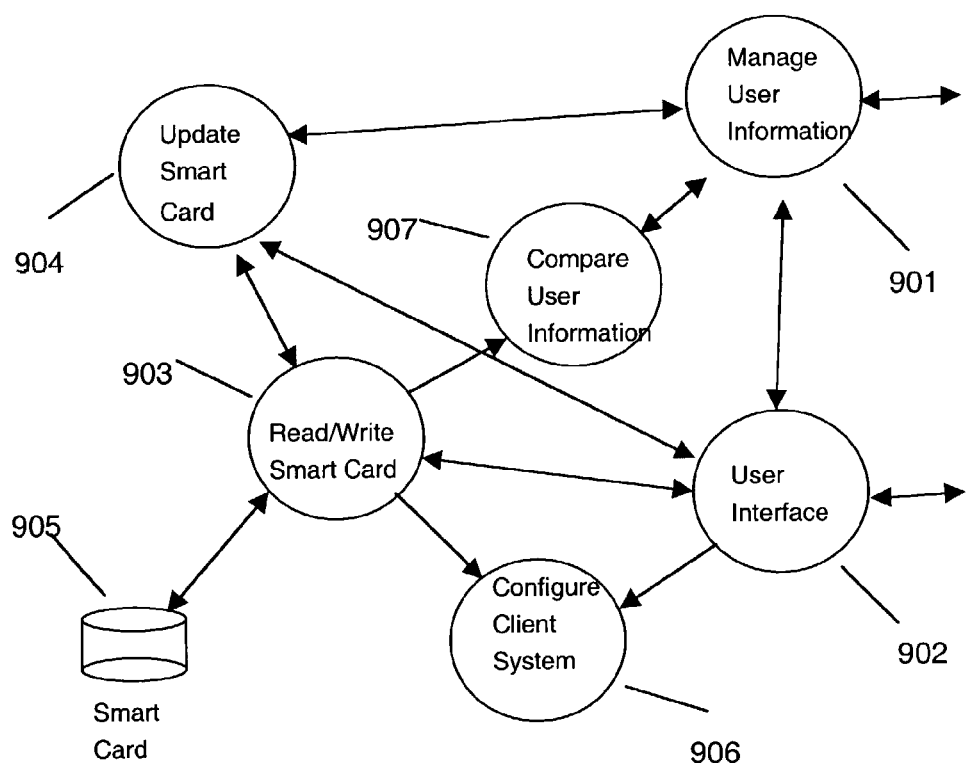
FIG. 9 is a block schematic diagram of a task-oriented viewpoint of a preferred embodiment of the invention illustrating the client and server tasks for a client-based data management system according to the invention.
Figure 9:
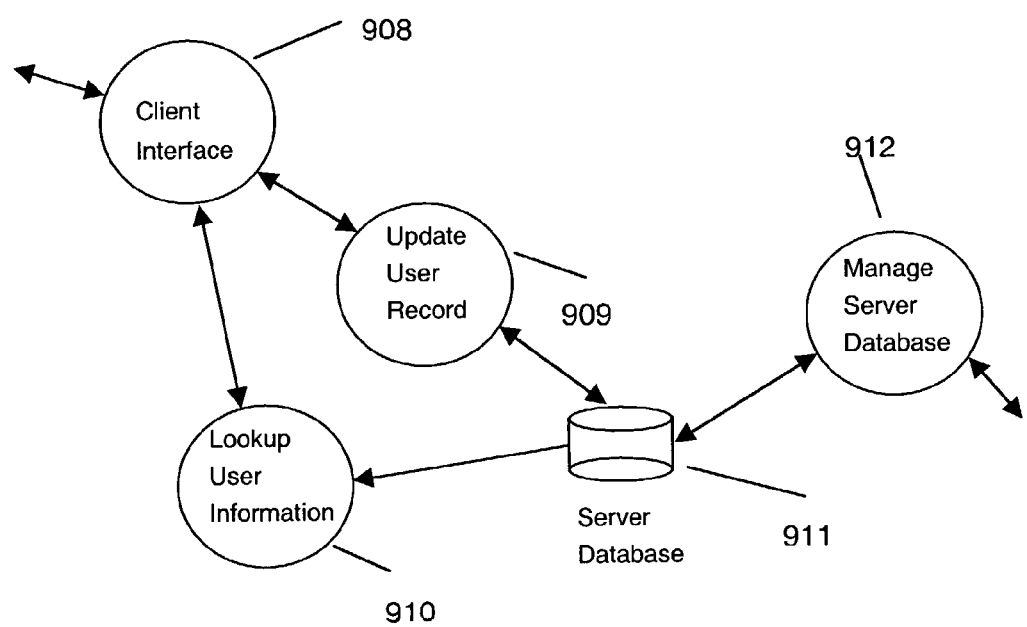

Referring to FIG. 9, another preferred embodiment of the invention is shown that performs that same basic functions as those described in FIG. 8, except that the client has a server connection that is most likely temporary in nature, e.g., a dialup modem connection. The difference in operation between FIGS. 8 and 9 is when the user manages his indices on his smart card and server database. The client connects to the Client Interface module 908 on the server through the Manage User Information module 901, resident on the client. The Client Interface 908 collects the user's indices for the Manage User Information module 901. The user's records are retrieved from the Server Database 911 by the Lookup User Information module 910.

Once the user's indices are received by the Manage User Information module 901, the client can disconnect from the server and the user manages his indices offline with the client. The Compare User Information module 907 operates in the same manner as described above. The information obtained from the Server Database 911 and the Smart Card 905 are displayed to the user through the User Interface 902. After the user has updated his indices and any changes to the user's records on the Server Database 911 are required, the client reconnects with the server's Client Interface 908. The Server Database 911 is updated with any changes by the Update User Record module 909.

Yet another preferred embodiment of the invention encrypts the entire Server Database 911. Each user record is individually encrypted such that if one user record is accessed and decrypted by a hacker, the other user records will not be compromised in any way. The actual encryption of a user record is performed by the client. The Manage User Information module 901 retrieves the user's encrypted record from the server. If this fails, then the user must create a new record to access. The server looks up, using the Smart Card's 905 ID, and retrieves the user's record through the Lookup User Information module 910. The server does not know what the contents of the record are, only that the record belongs to the user (much like a safety deposit box). The record is sent back to the client via the Client Interface module 908.

The Manage User Information module 901 decrypts the user record using the Smart Card 905 encryption key information stored in the Smart Card 905. Each smart card is unique and the encryption key only exists on a particular smart card and not on the server. Once the user has completed any changes to the indices in the record, the Manage User Information module 901 encrypts the user record using the encryption key on the Smart Card 905 and sends the record back to the server. The Client Interface module 908 sends the encrypted record to the Update User Record module 909 which replaces the user record in the Server Database 911 with the new encrypted user record.

This approach ensures that there is a one-to-one mapping of user records to smart cards; each user record in the Server Database 911 can only be decrypted by a specific smart card. It also ensures that the Server Database 911 is secure and cannot be easily compromised. The intruder would have to physically have every existing smart card to crack the entire database.

If a user loses his smart card, then there is a procedure where the smart card can be morphed, or recreated. The user inserts a new Smart Card 905 into the client system. The system through the User Interface module 902 has the user enter in his personal information in the same manner as when he first created his original smart card. The new Smart Card 905 is then initialized and the encryption key is recreated. The new smart card's ID is sent to the Client Interface module 908 from the User Interface module 902 via the Manage User Information module 901. The Update User Record module 909 removes the original smart card's ID from the user's record on the Server Database 911 and replaces it with the new smart card's ID. Once that is completed, the User Interface module 902 then places the encryption key in the new Smart Card 905 via the Read/Write Smart Card module 903. The user's smart card has now been recreated and the original smart card disabled.

The server has the ability to simultaneously perform the server functions described in FIGS. 8 and 9. This allows the server to handle both secure Web access and clients that have temporary server connections.

One skilled in the art will readily appreciate that although the client and server functionality are described separately above, both the client and server can reside on the same physical machine.

A preferred embodiment of the invention provides a computer usage regulation system. The invention allows a user or system administrator to regulate the time period or duration in which other users will have access to the host computer. There are many situations where the limitation of a user's access to a computer is desired. For example, manufacturing floors may only want workers designated for a certain shift to have access to a computer during that shift. The workers each have their own unique smart card that identifies the worker to the computer.

Additionally even though a user will have his mobile personal environment resident on his smart card, system administrators may want to limit his access to certain computers at certain time periods.

Another example is a situation where a parent wants to regulate a child's usage of the family computer. The child is given a smart card of his own that identifies him to the computer. The parent can designate the days of the week and times that the child is allowed to use the computer. The invention also allows the parent to set the total amount of time that the child is allowed to use the computer by setting total cumulative time per day, week, or month.

Figure 10:
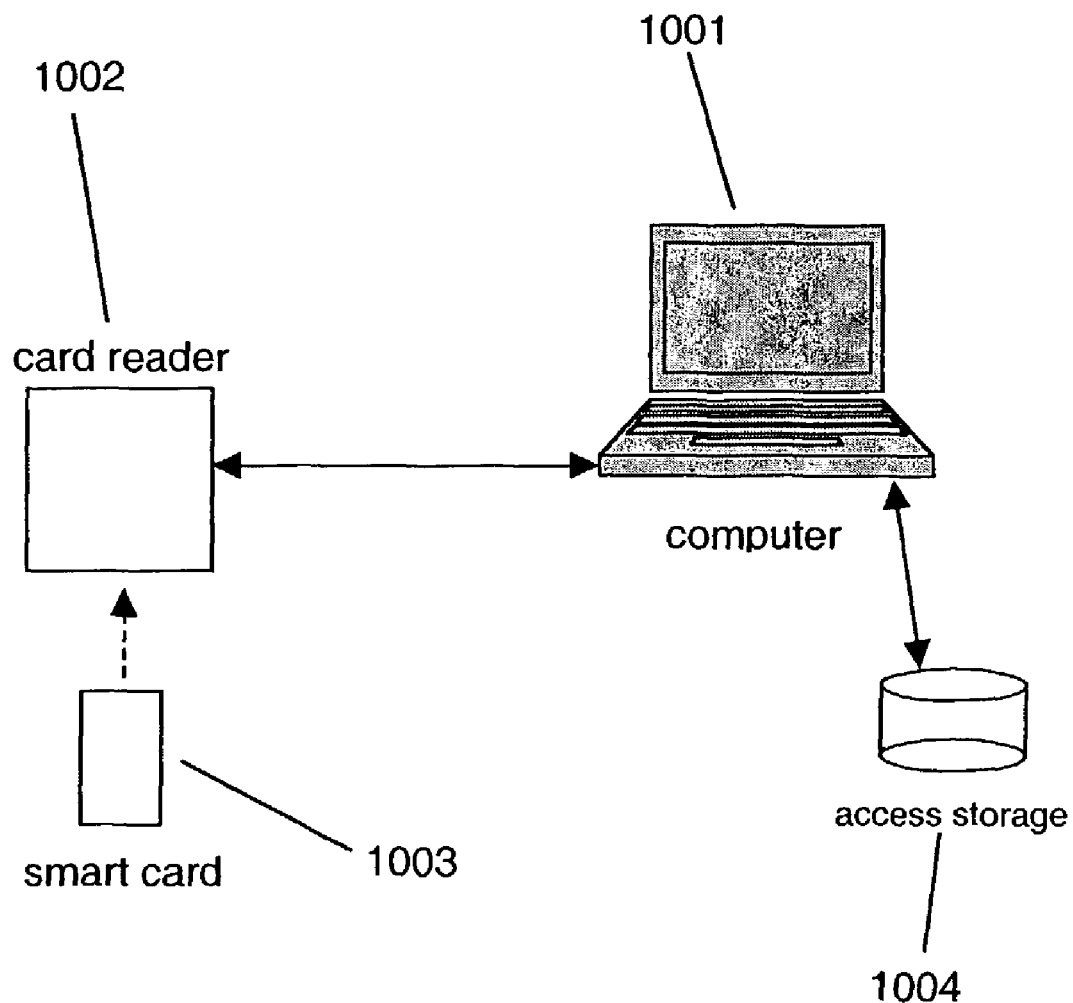
FIG. 10 is a schematic diagram showing a smart card reader connected to a computer system storing user or system administrator defined access information according to the invention.
Figure 11:
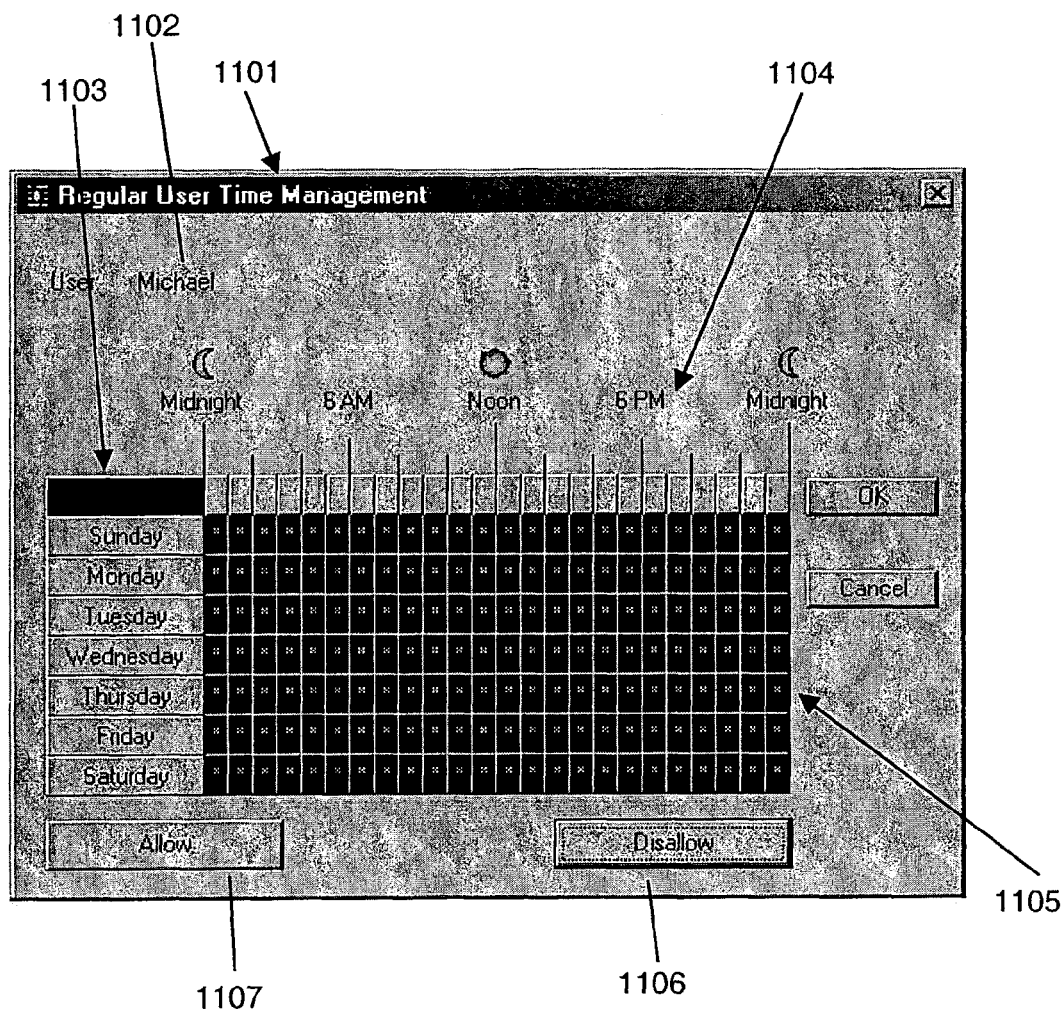
FIG. 11 is a schematic diagram showing a screen shot of an access time management interface according to the invention.

Referring to FIGS. 10 and 11, a smart card reader/terminal 1002 is connected to, or resident in, the host computer 1001. Initially, an administrator first inserts his smart card 1003 into the smart card reader/terminal 1002. The administrator then starts the invention to set user access times and/or durations.

The invention allows the administrator to designate which users are allowed access to the computer. The administrator designates himself as the primary user that is the only user allowed to change the access settings. The administrator lists the usernames that are allowed to access the computer 1001 then proceed with assigning access times for each user.

An administration program allows the administrator to insert smart cards into the smart card reader/terminal to set up a username and password for each user's smart card (as well as the administrator's). The information on the smart cards is also be entered using the mobile personal environment data as described above. The mobile personal environment data contains the user's smart card username and password which the invention accesses.

The administrator selects a particular user 1102 and the invention displays a grid 1102 showing the days of the week 1103 and the hours of the day 1104. The administrator simply clicks on a time box or highlights the times 1105 that he wants to block the user from accessing the computer and clicks on the disallow button 1106. If the administrator needs to change a blocked time back to unblocked, he similarly clicks or highlights the time and clicks on the allow button 1107. By default, the selected user has access allowed for the week.

The administrator can optionally set cumulative time limits for a user. The administrator can set maximum cumulative time limits per day, week, and/or month.

The invention stores the administrator's name and the entered usernames along with their access schedules and/or cumulative time limits in a hidden file on the computer's local storage device 1004. When the administrator logs off the computer 1001, the system locks the computer 1001 from any use. The invention sets itself up to run automatically whenever the computer 1001 is started. At startup, the invention locks out any use of the computer 1001.

When a user wants to use the computer 1001, the user p[laces his smart card 1003 into the smart card reader/terminal 1002. The host computer 1001 detects that a smart card has been inserted into the smart card reader/terminal 1002 and notifies the invention. The invention reads the username and password from the smart card 1003 and queries the user for his password. The invention verifies the entered password with the password retrieved from the smart card 1003. If the entered password is invalid, access is denied.

If the entered password is valid, the invention then looks up the user's username in the hidden file on the computer's storage device 1004. if the user's username is not listed as one of the users that has access to the computer 1001, then access is denied.

Otherwise, the invention finds the user's username and its associated access times and/or cumulative time limits in the hidden file. If the current time falls outside of any of the valid access times, then access is denied. If the user's cumulative usage time exceeds the specified cumulative time limit (if any are specified), then access is denied.

if the current time is within any of the valid access times and the user's cumulative usage time is within the specified cumulative time limit, then access is granted.

The invention periodically checks the current time while the user is using the computer 1001. The invention warns the user if a blocked access time is approaching. The system will warn at preset intervals, for example, 30 minutes before the blocked time period starts, every 10 minutes thereafter, then one minute before. The warning will tell the user to save his work before the system logs him off of the computer 1001. Once the blocked time period is entered, the system logs the user off the machine (if he has not logged off) and locks the computer 1001 from any use.

if a cumulative time limit was specified, when the system performs its periodic check of the current time, it will add the time since the last check to the user's cumulative usage time. If the user's cumulative usage time is about to exceed any of the specified cumulative time limits, then the user is warned. As above, the system will warn at preset intervals such as 30 minutes before the blocked time period starts, every 10 minutes thereafter, then one minute before. The warning will tell the user that his cumulative time limit is about to be reached and to save his work before the system logs him off of the computer 1001. Once the blocked time period is entered, the system logs the user off the machine (if he has not logged off) and locks the computer 1001 from any use. The system can optionally shut down all of the user's running programs during the lockdown stage.

Figure 12:
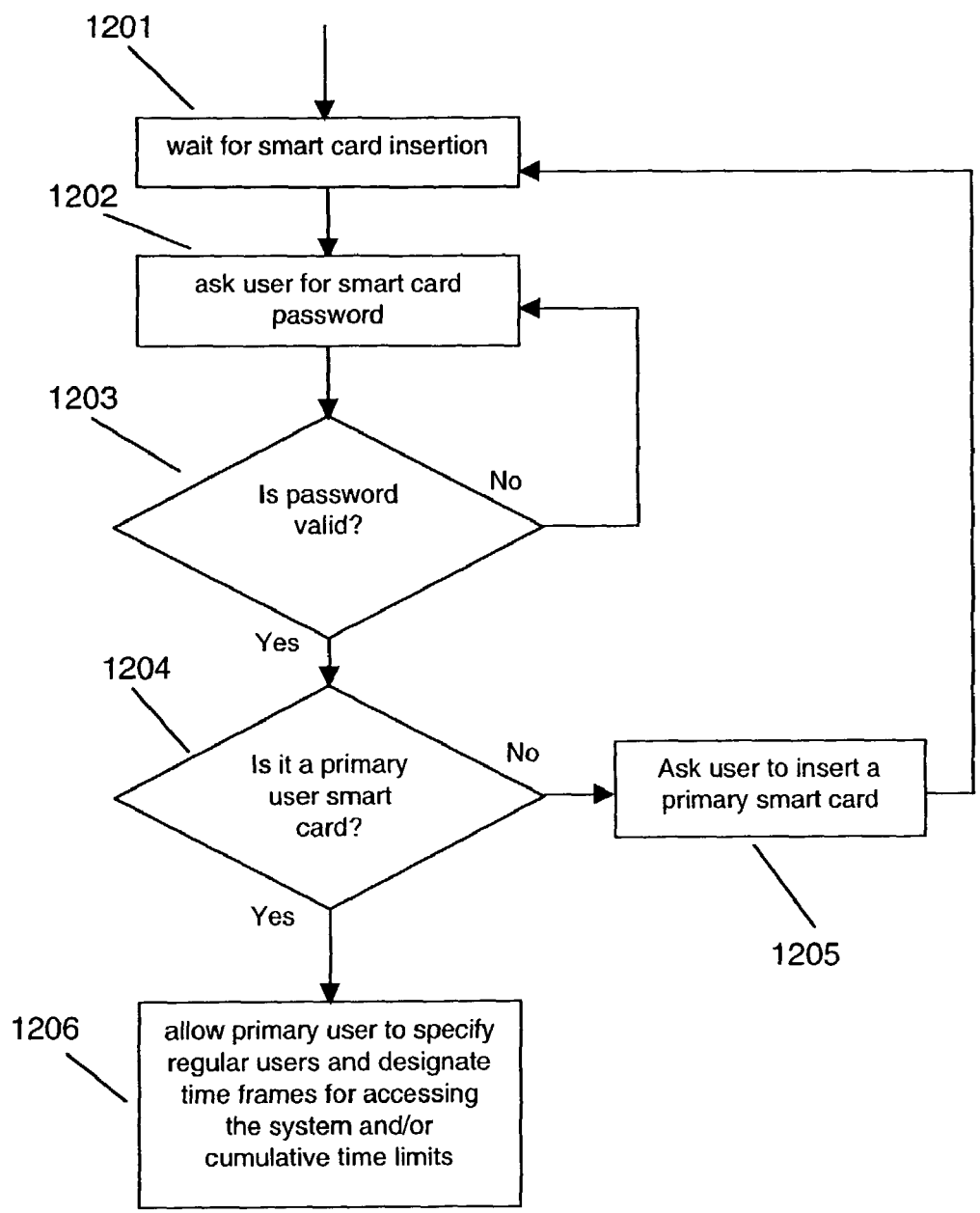
FIG. 12 is a block schematic diagram of a flowchart showing the validation of a primary user before allowing the primary user to set access times for other users according to the invention.

With respect to FIG. 12, a flowchart is shown for the invention's administration mode. On first boot, the system is configured by the user or system administrator designating a primary user that is allowed to make changes to the system's access control rules for system users. The invention then follows the flowchart whenever the system's administration mode is entered. The system waits for a smart card to be inserted into an attached or co-resident smart card reader/terminal 1201. When a smart card is inserted into the smart card reader, the system asks the user to enter his smart card password 1202. The user enters his password and the password is compared to the password on the smart card to see if they match 1203. If it is not valid, the system returns to requesting the user for his password 1202.

If the entered password is valid, then the system checks if the smart card is a designated primary user's card 1204. If it is not, then the system asks the user to insert a primary user's smart card 1205 and waits for a new card to be inserted 1201.

Otherwise, the system allows the primary user to enter authorized usernames and to define each user's access times and/or optional cumulative time limits 1206, as described above. The primary user's settings are stored in a hidden file, database, file, or Windows registry, for example, on the host computer's storage device. A hidden file can be used that is difficult to intentionally or accidentally remove from the computer.

Figure 13:
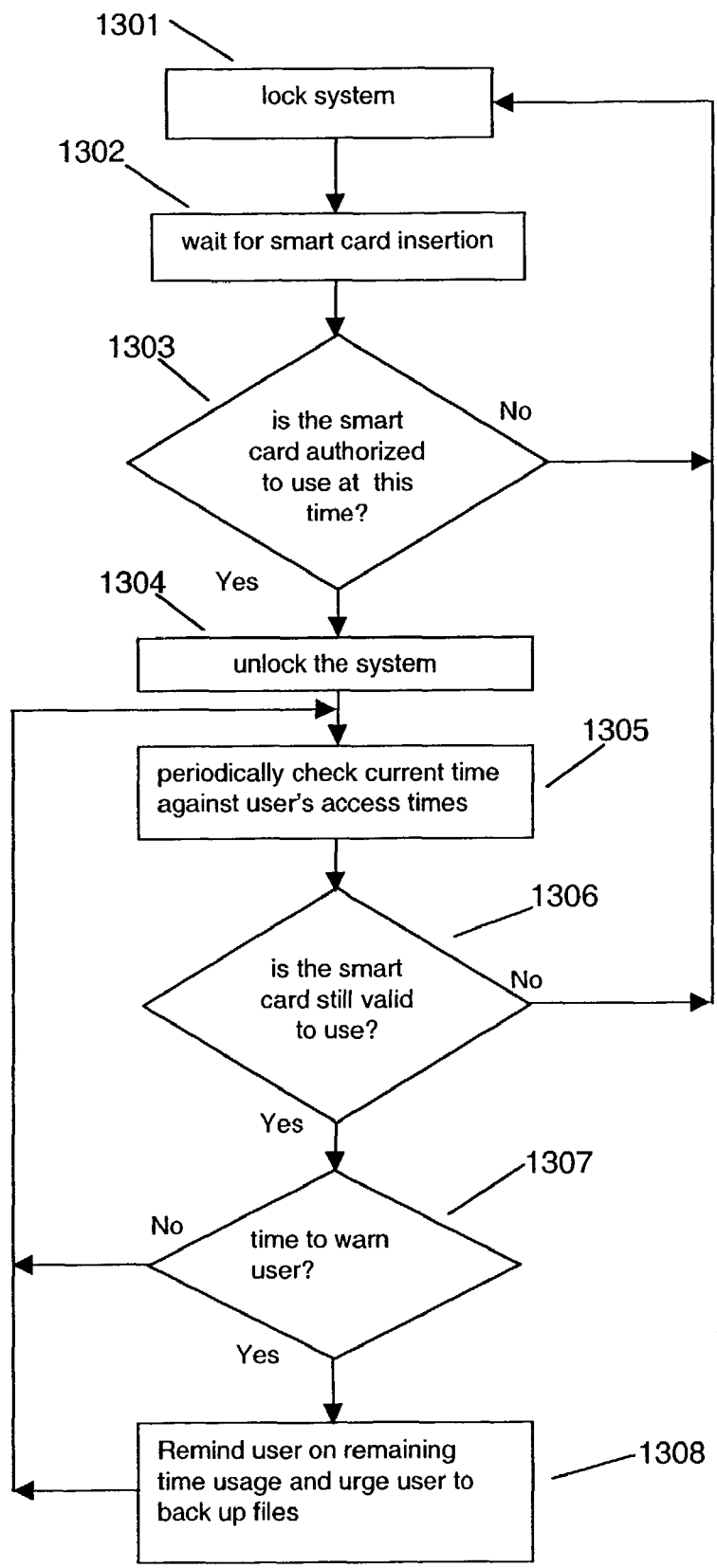
FIG. 13 is a block schematic diagram of a flowchart showing the normal operation of the invention's verification of a user and the regulation of access time periods according to the invention.

Referring to FIG. 13, once the system has been initialized by the primary user, it is automatically executed upon startup of the host computer. The system locks the computer from user access after bootup 1301. The system then waits for a smart card or memory card to be inserted into an attached or co-resident smart card reader/terminal 1302. When a smart card is inserted into the smart card reader, the system asks the user to enter his smart card password as described above. The user enters his password and the password is compared to the password on the smart card to see if they match. If it is not valid, the system requests the user for his password.

If the entered password is valid, the invention then looks up the user's username in the hidden file on the computer's storage device. if the user's username is not listed as one of the users that has access to the computer 1303, then access is denied, the user is notified that he is not authorized, and the system stays locked 1301.

Otherwise, the invention finds the user's username and its associated access times and/or cumulative time limits in the hidden file, database, file, or Windows registry, for example, on the host computer's storage device. If the current time falls outside of any of the valid access times 1303, then access is denied, the user is notified that his access is blocked at this time, and the system stays locked 1301. Also, at this point if the optional cumulative time limit is set, if the user's cumulative usage time exceeds the specified cumulative time limit 1303, then access is denied, the user is notified that he has exceeded his limit, and the system stays locked 1301.

if the current time is within any of the valid access times and (optionally) the user's cumulative usage time is within the specified cumulative time limit, then access is granted and the system is unlocked 1304.

The invention periodically checks the current time while the user is using the computer 1305, 1306. The invention warns the user if a blocked access time is approaching 1307, 1308. The system will warn at preset intervals, for example, 30 minutes before the blocked time period starts, every 10 minutes thereafter, then one minute before. The warning will tell the user to save his work before the system logs him off of the computer 1308. If it is not time to warn the user, then the system goes back to periodic checking 1305.

Once the blocked time period is entered 1306, the system logs the user off the machine (if he has not logged off) and locks the computer from any use 1301. The system can optionally shut down all of the user's running programs during the lockdown stage.

if a cumulative time limit was specified, when the system performs its periodic check of the current time, it will add the time since the last check to the user's cumulative usage time and store the new cumulative time in the hidden file. If the user's cumulative usage time is about to exceed any of the specified cumulative time limits, then the user is warned 1307, 1308. As above, the system will warn at preset intervals for example, 30 minutes before the blocked time period starts, every 10 minutes thereafter, then one minute before. The warning will tell the user that his cumulative time limit is about to be reached and to save his work before the system logs him off of the computer 1308. Once the blocked time period is entered, the system logs the user off the machine (if he has not logged off) and locks the computer from any use 1301. The system can optionally shut down all of the user's running programs during the lockdown stage.

Cumulative usage times are cleared when the cumulative time limit expires. For example, if the user has a cumulative time limit of 30 minutes per day, his cumulative usage time is reset when a particular day ends. The same goes with week and month limits.

If at any time the user's smart card is removed from the smart card reader/terminal the system will shut down all of the user's programs and lock the system 1301.

Figure 14:
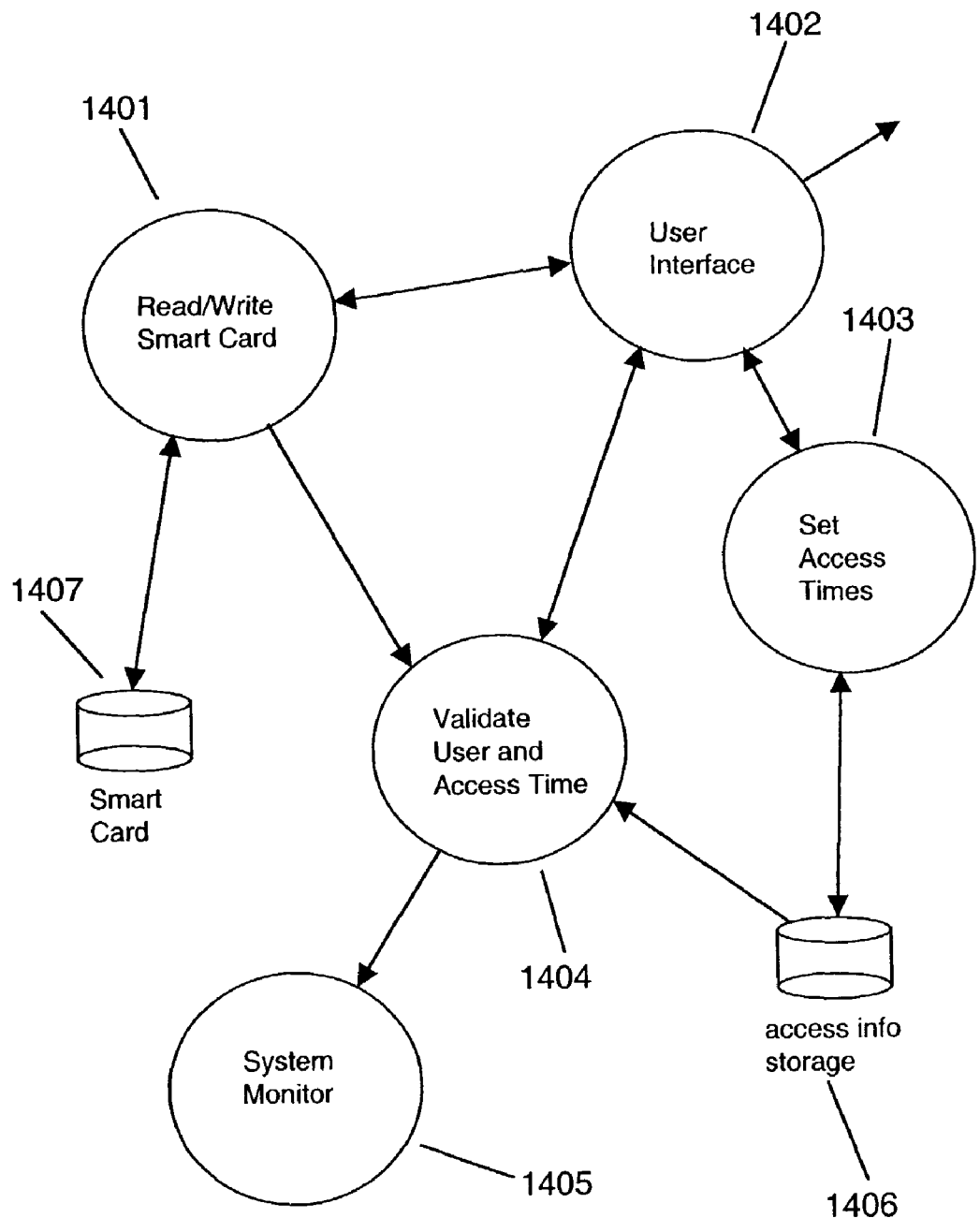
FIG. 14 is a block schematic diagram of a task-oriented viewpoint of a preferred embodiment of the invention illustrating the modules involved with setting access time periods, identifying valid user smart cards, and regulating user accesses via the time periods according to the invention.

Referring to FIG. 14, a task viewpoint of the invention is shown. The Read/Write Smart Card module 1401 waits for a smart card 1407 to be inserted into an attached or co-resident smart card reader/terminal. When a smart card 1407 is inserted into the smart card reader, the User Interface module 1402 asks the user to enter his smart card password. The user enters his password and the password is compared to the password on the smart card to see if they match. If it is not valid, the User Interface Module 1402 returns to requesting the user for his password.

If the entered password is valid, then the User Interface module 1402 notifies the Validate User and Access Time module 1404. The Validate User and Access Time module 1404 checks if the smart card 1407 is a designated primary user's card. If it is not, then the User Interface module 1402 asks the user to insert a primary user's smart card the wait process continues as before.

Otherwise, the User Interface module 1402 and the Set Access Time module 1403 allow the primary user to enter authorized usernames and to define each user's access times and/or optional cumulative time limits, as described above. The primary user's settings are stored in access information storage 1406 which can be a hidden file, database, file, or Windows registry, for example.

During normal operation, the System Monitor 1405 locks the system from user access. When the Read/Write Smart Card module 1401 detects that a smart card 1407 has been inserted in to the card reader, the User Interface module 1402 performs the password verification described above.

If the entered password is valid, the Validate User and Access Time module 1404 then looks up the user's username obtained from the smart card 1407 in the access information storage 1406. If the user's username is not listed as one of the users that has access to the computer, then access is denied, the user is notified through the User Interface module 1402 that he is not authorized, and the System Monitor 1405 keeps the computer locked.

Otherwise, the Validate User and Access Time module 1404 finds the user's username and its associated access times and/or cumulative time limits in the access information storage 1406. If the current time falls outside of any of the valid access times, then access is denied, the user is notified through the User Interface module 1402 that his access is blocked at this time, and the System Monitor 1405 keeps the computer locked. Also, at this point if the optional cumulative time limit is set, if the user's cumulative usage time exceeds the specified cumulative time limit, then access is denied, the user is notified through the User Interface module 1402 that he has exceeded his limit, and the System Monitor 1405 keeps the computer locked.

if the current time is within any of the valid access times and (optionally) the user's cumulative usage time is within the specified cumulative time limit, then access is granted, the user is notified through the User Interface module 1402, and the system is unlocked by the System Monitor 1405.

The Validate User and Access Time module 1404 periodically checks the current time while the user is using the computer. The User Interface module 1402 warns the user if a blocked access time is approaching. The User Interface module 1402 will warn at preset intervals, as described above.

Once the Validate User and Access Time module 1404 determines that the blocked time period is entered, the System Monitor 1405 logs the user off the machine (if he has not logged off) and locks the computer from any use. The System Monitor 1405 can optionally shut down all of the user's running programs during the lockdown stage.

if a cumulative time limit was specified, when the Validate User and Access Time module 1404 performs its periodic check of the current time, it will add the time since the last check to the user's cumulative usage time and store the new cumulative time in the access information storage 1406. If the user's cumulative usage time is about to exceed any of the specified cumulative time limits, then the user is warned through the User Interface module 1402 as described above. The warning will tell the user that his cumulative time limit is about to be reached and to save his work before the system logs him off of the computer. Once the blocked time period is entered, the System Monitor 1405 logs the user off the machine (if he has not logged off) and locks the computer from any use. The System Monitor 1405 can optionally shut down all of the user's running programs during the lockdown stage.

If at any time the user's smart card 1407 is removed from the smart card reader/terminal the System Monitor 1405 will shut down all of the user's programs and lock the system.

Yet another preferred embodiment of the invention allows a user to use a low-cost memory card to automatically log onto a computer running the Microsoft Windows XP operating system. Both Microsoft Windows 2000 and XP support smart card logon. However, only expensive smart cards with processors are supported. There is a need to allow user to save on the overall cost of security devices through the use of low-cost smart cards (memory cards) for logon.

The invention goes beyond the Windows XP logon process by allowing a user to automatically logon by simply inserting his smart card into a smart card reader/terminal attached to or resident in the computer. The invention requires a user to validate his smart card password once and remembers that user has validated his smart card password. The user can then remove his smart card from the reader and the invention will lock the system. If the user comes back to the computer and re-inserts his smart card into the reader, the invention will unlock the computer and the user will continue from where he left off.

However, if another user inserts his smart card into the reader, the invention will log the previous user off Windows XP and the user's processes are terminated. the new user is asked his smart card password and the process continues as described above.

Figure 15:
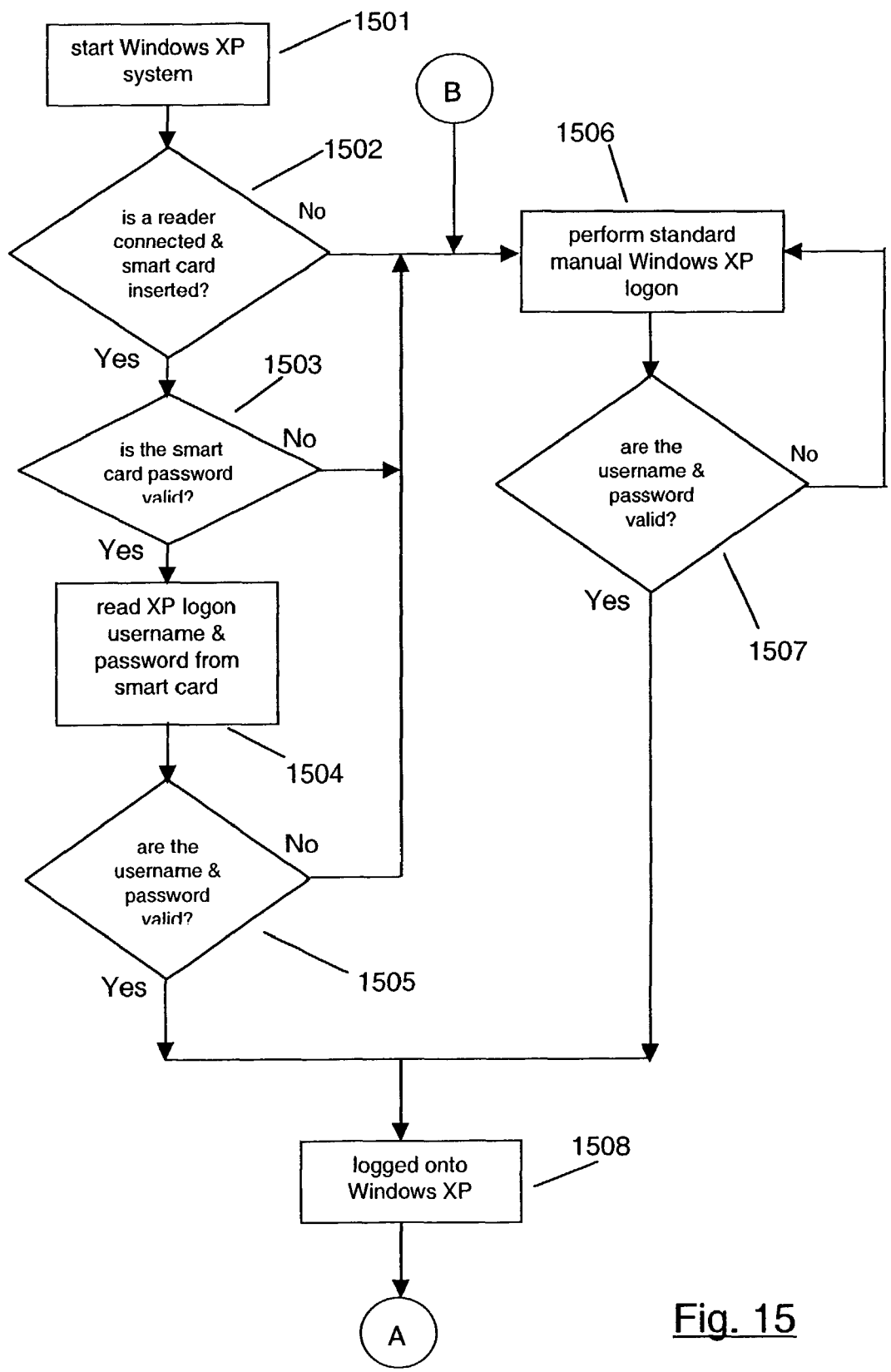
FIG. 15 is a block schematic diagram of a flowchart showing a preferred embodiment of the invention's automatic logon to Windows XP using low-cost memory cards according to the invention.
Figure 16:
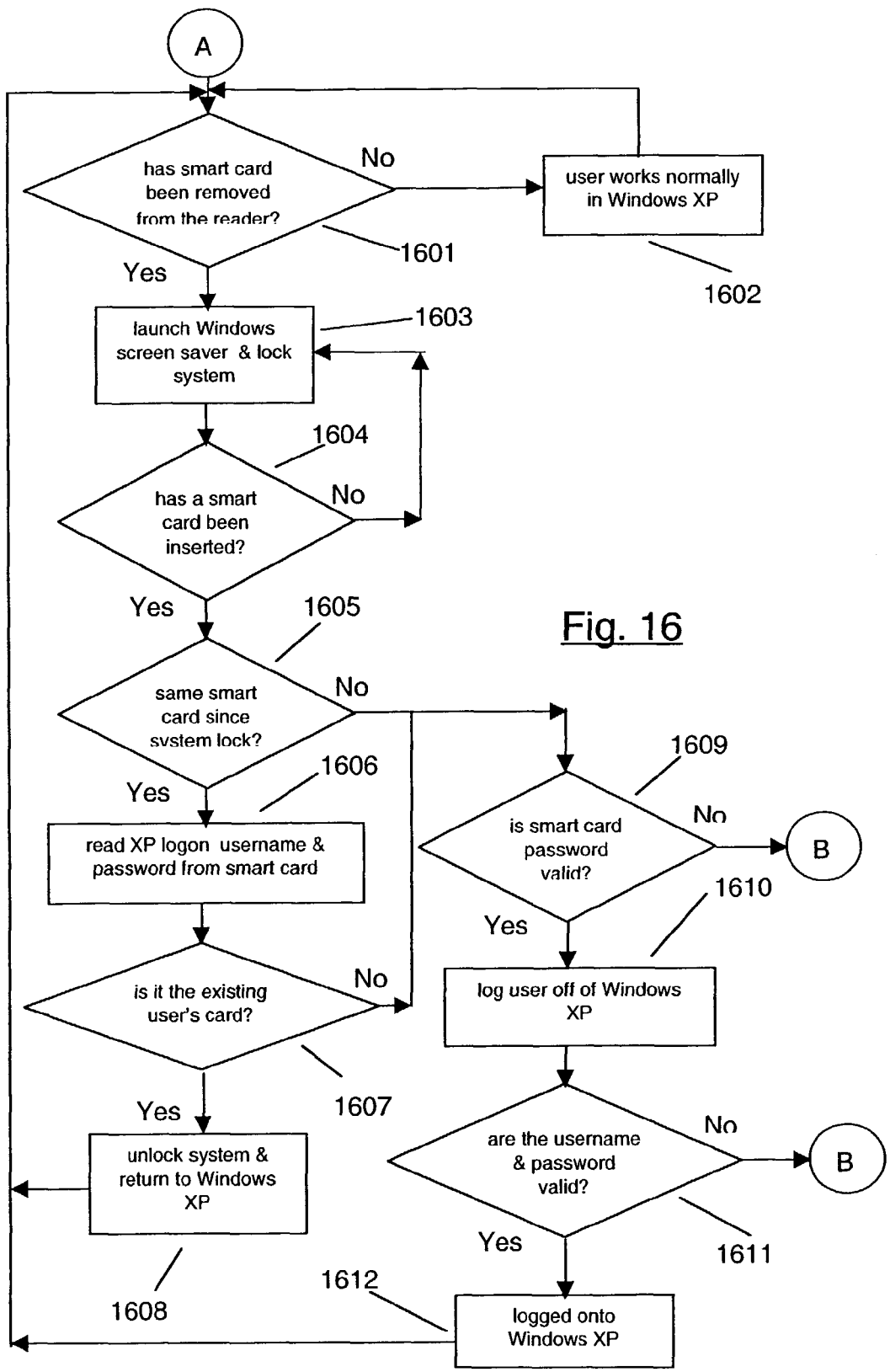
FIG. 16 is a block schematic diagram of a flowchart showing a preferred embodiment of the invention's automatic logon to Windows XP using low-cost memory cards according to the invention.

Referring to FIGS. 15 and 16, the invention provides a system that intercedes into the Windows XP operating system for low-cost memory card logon. The Windows XP dynamic link library (dll) file called gina.dll is replaced with a customized file. The customized gina.dll file recognizes the low-cost smart card (memory card) format. When a smart card is inserted into the smart card reader, the Windows XP operating system calls the gina.dll file.

When Windows XP starts, it performs its hardware initialization and discovery. If a smart card reader is not connected and/or a smart card is not inserted, Windows XP continues on its normal execution path and starts its standard manual logon process by asking for the user's username and password 1506.

If a smart card reader is connected and a smart card is inserted, then Windows XP calls the gina.dll file 1502. The gina.dll file executes and looks at the smart card's electrical signals to determine that the card is a low-cost memory smart card 1502. If it is, then the invention reads the smart card password on the memory card. The user is requested to enter his smart card password which is then verified against the password obtained from the memory card 1503. If the password is not valid, then the system reverts to the standard Windows XP logon process by calling the Windows logon executable file 1506.

If the smart card password is correct, the system records it for later use and retrieves the Windows domain name and password from the smart card 1504. The Windows XP domain name and password can be placed on the memory card using the mobile personal environment data storage methods described above. The Windows XP domain name and password are part of the user's mobile personal environment data. The gina.dll file then calls the Windows logon executable file, passing it the domain name and password retrieved from the memory card 1505. The Windows XP domain name and password are recorded for later use. If the logon fails Windows XP will automatically revert to a manual logon 1506.

Otherwise, the user is successfully logged onto Windows XP 1508. During normal use, the user works normally 1602 in Windows. The Windows XP operating system will call the gina.dll file if the memory card is removed from the reader 1601. Once the removal of the memory card is detected, the invention launches the windows screen saver and locks the system from user access 603.

When a smart card has been inserted in to the reader, Windows again calls the gina.dll file 1604. The invention checks to see if the newly inserted memory card is the same one that was removed. The smart card password is retrieved from the memory card 605. If the password is the same as the password recorded earlier, then the Windows domain name and password is retrieved from the smart card 1607.

If the Windows domain name and password from the smart card match the recorded Windows domain name and password 1607, then the invention unlocks the computer and the user returns back to his Windows XP session 1609, 1602.

Otherwise, the user is requested to enter his smart card password which is then verified against the password obtained from the memory card 1609. If the password is not valid, then the system reverts to the standard Windows XP logon process by calling the Windows logon executable file 1506.

If the smart card password is correct, the system records it for later use and the invention logs the previous user off of Windows 1609, 1610. This allows multiple users to share the Windows XP system. Multiple users are allowed to use the same machine but not share in-progress programs as specified by Windows XP (Fast User Switch). The invention retrieves the Windows domain name and password from the smart card and calls the Windows logon executable file, passing it the domain name and password retrieved from the memory card 1611. The Windows XP domain name and password are recorded for later use. If the logon fails Windows XP will automatically revert to a manual logon 1506.

Otherwise, the user is logged onto and works normally in Windows XP 1612, 1602

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

The invention claimed is:

1. A process for controlling access to a host computer, said process comprising:
    detecting that a transportable memory device is in communication with said host computer;
    accessing a first password and a username from said transportable memory device;
    accessing a second password entered by a user;
    if said first password matches said second password, then: (i) searching for said username on a stored list of valid users, (ii) retrieving access time intervals associated with said username, and (iii) granting host computer access to said user by unlocking said host computer if the current time is within any of said access time intervals associated with said username;
    after said granting, logging said user into a session and permitting data to be transferred from said transportable memory device, wherein said data is encrypted using an encryption key that is resident on said transportable memory device and wherein said data comprises information used to configure said host computer system according to preferences specific to said user;
    locking said host computer from user access if said transportable memory device is removed from said host computer;
    detecting that said transportable memory device is again in communication with said host computer; and
    with said transportable memory device again in communication with said host computer, restoring said session at the point at which said transportable memory device was previously removed and granting host computer access to said user by unlocking said host computer if the current time is within any of said access time intervals associated with said username.

2. The process of claim 1, wherein only a designated primary user is allowed to define said valid users and said access time intervals.

3. The process of claim 1, further comprising denying access to said user if the current time falls outside all of said access time intervals.

4. The process of claim 1, further comprising warning said user if the current time is approaching the end of an access time interval for said username; wherein said warning is issued to said user at preset intervals.

5. The process of claim 1, further comprising:
    determining that an access time interval for said username has ended; and
    logging said user off said host computer and locking said host computer from user access.

6. The process of claim 5, further comprising shutting down all of said user's running programs.

7. The process of claim 1, further comprising accessing a cumulative time limit defined for said username, wherein said granting also depends on whether cumulative usage time for said username is within said cumulative time limit and wherein said user is denied access if cumulative usage time for said username exceeds said cumulative time limit.

8. The process of claim 7, further comprising warning said user if cumulative usage time for said username is about to exceed said cumulative time limit; wherein said warning is issued at preset intervals.

9. The process of claim 7, further comprising:
    determining that a cumulative time limit for said username has been exceeded; and
    logging said user off said host computer and locking said host computer from user access if said cumulative time limit is exceeded.

10. The process of claim 9, further comprising shutting down all of said user's running programs if said cumulative time limit is exceeded.

11. An apparatus for controlling access to a host computer, said apparatus comprising a memory storing instructions which, when executed by one or more processors, cause said one or more processors to perform a method comprising:
    detecting that a transportable memory device is in communication with said host computer;
    accessing a first password and a username from said transportable memory device;
    accessing a second password entered by a user;
    if said first password and said second password match, then: (i) searching for said username on a stored list of valid usernames, ii) retrieving access time intervals associated with said username, and iii) granting host computer access to said user by unlocking said host computer if the current time is within any of said access time intervals associated with said username; and
    after said granting, initiating a session and permitting data to be transferred from said transportable memory device, wherein said data is encrypted using an encryption key that is resident on said transportable memory device and wherein said data comprises information used to configure said host computer system according to preferences specific to said user;
    locking said host computer from user access if said transportable memory device is removed from said host computer;
    detecting that said transportable memory device is again in communication with said host computer; and
    with said transportable memory device again in communication with said host computer, restoring said session at the point at which said transportable memory device was previously removed and granting host computer access to said user by unlocking said host computer if the current time is within any of said access time intervals associated with said username.

12. The apparatus of claim 11, wherein only a designated primary user is allowed to define said valid users and said access time intervals.

13. The apparatus of claim 11, wherein said user is denied access if the current time falls outside all of said access time intervals.

14. The apparatus of claim 11, wherein said user is warned if the current time is approaching the end of an access time interval for said username; wherein said warning is issued to said user at preset intervals.

15. The apparatus of claim 11, wherein said user is logged off said host computer and said host computer is locked from user access if an access time interval for said username ends.

16. The apparatus of claim 15, wherein said all of said user's running programs are shut down if said access time interval ends.

17. The apparatus of claim 11, wherein a cumulative time limit is defined for said username, and wherein access is granted to said user if cumulative usage time for said username is within said cumulative time limit and wherein access is denied to said user if cumulative usage time exceeds said cumulative time limit.

18. The apparatus of claim 17, wherein said user is warned if cumulative usage time for said username is about to exceed said cumulative time limit; wherein said warning is issued at preset intervals.

19. The apparatus of claim 17, wherein said user is logged off said host computer and said host computer is locked from user access if said cumulative time limit is exceeded.

20. The apparatus of claim 19, wherein all of said user's running programs are shut down if said cumulative time limit is exceeded.

21. The process of claim 1, wherein said transportable memory device is a smart card and wherein said detecting comprises detecting that a smart card has been inserted into a smart card reader connected to said host computer.

22. The apparatus of claim 11, wherein said transportable memory device is a smart card.

\* \* \* \* \*